US012803972B2

(12) United States Patent
Albero et al.

(10) Patent No.: US 12,803,972 B2
(45) Date of Patent: Nov. 17, 2026

(54) SYSTEM AND METHOD FOR AUTOGENERATED AUTHENTICATION OF NETWORK COMMUNICATIONS

(71) Applicant: BANK OF AMERICA CORPORATION, Charlotte, NC (US)

(72) Inventors: George Anthony Albero, Charlotte, NC (US); Maharaj Mukherjee, Poughkeepsie, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 171 days.

(21) Appl. No.: 18/236,241

(22) Filed: Aug. 21, 2023

(65) Prior Publication Data

US 2025/0071107 A1 Feb. 27, 2025

(51) Int. Cl.
*H04L 9/40* (2022.01)

(52) U.S. Cl.
CPC .................................. *H04L 63/083* (2013.01)

(58) Field of Classification Search
CPC .......................... H04L 63/083; H04L 63/0838
See application file for complete search history.

(56) References Cited

U.S. PATENT DOCUMENTS 6,161,139 A 12/2000 Win et al.
6,370,649 B1 4/2002 Angelo et al.
6,609,198 B1 8/2003 Wood et al.
6,908,030 B2 6/2005 Rajasekaran et al.
7,711,786 B2 * 5/2010 Zhu ........................ H04L 9/0891 709/227
7,840,993 B2 11/2010 Ganesan et al.
8,254,542 B2 8/2012 Frederick
8,281,375 B2 10/2012 Von Krogh
8,285,639 B2 10/2012 Eden et al.
8,296,823 B2 10/2012 Schubert
8,301,877 B2 10/2012 Grajek et al.
8,302,180 B1 10/2012 Gudov et al.
8,302,187 B1 10/2012 Gupta et al.
8,917,826 B2 12/2014 Bravo et al.
(Continued)

FOREIGN PATENT DOCUMENTS

CN 112235105 1/2021

*Primary Examiner* — Catherine Thiaw
*Assistant Examiner* — Nega Woldemariam
(74) *Attorney, Agent, or Firm* — Moore & Van Allen PLLC; Nicholas C. Russell

(57) ABSTRACT

Systems, computer program products, and methods for autogenerated authentication of network communications. The method includes determining a first verification node and a second verification node. The first verification node is used to generate a first representation of a first segment of a passcode and the second verification node is used to generate a second representation of a second segment of the passcode. The method also includes receiving the first representation from the first verification node and the second representation from the second verification node. The first representation corresponds to each of the one or more characters in the first segment. The second representation corresponds to each of the one or more characters in the second segment. The method still further includes verifying the first segment and the second segment based on at least one verification key. The method also includes providing approval to an access request associated with a user.

17 Claims, 5 Drawing Sheets

(56) References Cited

U.S. PATENT DOCUMENTS

| | | | | |
|---|---|---|---|---|
| 10,735,398 | B1 * | 8/2020 | Covati | H04L 63/0838 |
| 2008/0147831 | A1 * | 6/2008 | Redjaian | H04L 67/52 709/222 |
| 2009/0044013 | A1 * | 2/2009 | Zhu | H04L 9/0891 713/170 |
| 2010/0169958 | A1 * | 7/2010 | Werner | G06F 21/36 726/19 |
| 2013/0305325 | A1 | 11/2013 | Headley | |
| 2014/0122896 | A1 * | 5/2014 | Chen | G06F 21/602 713/189 |
| 2016/0087792 | A1 * | 3/2016 | Smith | H04L 9/0836 380/278 |
| 2016/0182486 | A1 * | 6/2016 | Wu | H04L 9/0891 726/28 |
| 2017/0364911 | A1 * | 12/2017 | Landrok | G06Q 20/385 |
| 2020/0162450 | A1 * | 5/2020 | Yarabolu | H04L 63/0807 |
| 2021/0203485 | A1 * | 7/2021 | Afanasyeva | H04L 9/0897 |
| 2022/0067164 | A1 * | 3/2022 | Liu | G06F 21/572 |
| 2023/0066582 | A1 * | 3/2023 | Le Van Gong | H04L 9/50 |
| 2025/0071107 | A1 * | 2/2025 | Albero | H04L 63/0838 |

* cited by examiner

SYSTEM AND METHOD FOR AUTOGENERATED AUTHENTICATION OF NETWORK COMMUNICATIONS

TECHNOLOGICAL FIELD

Example embodiments of the present disclosure relate generally to network authentication and, more particularly, to autogenerated authentication of network communications.

BACKGROUND

Multi-factor authentication has improved network security. However, multi-factor authentication is still susceptible to malfeasant actors intercepting the authentication information in order to gain unauthorized access. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present disclosure, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

In an example embodiment, a system for autogenerated authentication of network communications is provided. The system includes at least one non-transitory storage device containing instructions and at least one processing device coupled to the at least one non-transitory storage device. The at least one processing device, upon execution of the instructions, is configured to determine a first verification node and a second verification node. The first verification node is used to generate a first representation of a first segment of a passcode. The second verification node is used to generate a second representation of a second segment of the passcode. The at least one processing device, upon execution of the instructions, is also configured to receive the first representation of the first segment from the first verification node. The first representation corresponds to each of the one or more characters in the first segment of the passcode. The at least one processing device, upon execution of the instructions, is further configured to receive the second representation of the second segment from the second verification node. The second representation corresponds to each of the one or more characters in the second segment of the passcode. The at least one processing device, upon execution of the instructions, is still further configured to verify the first segment and the second segment of the passcode based on at least one verification key. The at least one processing device, upon execution of the instructions, is also configured to provide approval to an access request associated with a user. The user is provided access to a network based on the approval to the access request.

In various embodiments, the at least one processing device, upon execution of the instructions, is configured to receive the access request associated with the user with the access request including a request for the passcode to be provided and the passcode being used to provide access to the user.

In various embodiments, the at least one processing device, upon execution of the instructions, is configured to determine the passcode based on the first representation of the first segment and the second representation of the second segment.

In various embodiments, the approval to the access request is providing the passcode to an entity associated with the access request. In various embodiments, the access request includes a request for a one-time password to be used to receive access to the network.

In various embodiments, the at least one processing device, upon execution of the instructions, is configured to determine a third verification node with the third verification node being used to generate a third representation of a third segment of the passcode; receive the third representation of the third segment from the third verification node with the third representation corresponding to each of the one or more characters in the third segment of the passcode; and verify the third representation of the passcode based on the at least one verification key.

In various embodiments, the at least one processing device, upon execution of the instructions, is configured to cause a transmission of the first segment of the passcode to the first verification node and cause a transmission of the second segment of the passcode to the second verification node.

In another example embodiment, a computer program product for autogenerated authentication of network communications is provided. The computer program product includes at least one non-transitory computer-readable medium having computer-readable program code portions embodied therein. The computer-readable program code portions include one or more executable portions configured to determine a first verification node and a second verification node. The first verification node is used to generate a first representation of a first segment of a passcode and the second verification node is used to generate a second representation of a second segment of the passcode. The computer-readable program code portions include one or more executable portions also configured to receive the first representation of the first segment from the first verification node. The first representation corresponds to each of the one or more characters in the first segment of the passcode. The computer-readable program code portions include one or more executable portions further configured to receive the second representation of the second segment from the second verification node. The second representation corresponds to each of the one or more characters in the second segment of the passcode. The computer-readable program code portions include one or more executable portions still further configured to verify the first segment and the second segment of the passcode based on at least one verification key. The computer-readable program code portions include one or more executable portions also configured to provide approval to an access request associated with a user, wherein the user is provided access to a network based on the approval to the access request.

In various embodiments, the computer-readable program code portions including one or more executable portions are also configured to receive the access request associated with the user with the access request including a request for the passcode to be provided and the passcode being used to provide access to the user.

In various embodiments, the computer-readable program code portions including one or more executable portions are also configured to determine the passcode based on the first representation of the first segment and the second representation of the second segment.

In various embodiments, the approval to the access request is providing the passcode to an entity associated with the access request. In various embodiments, the access request comprises a request for a one-time password to be used to receive access to the network.

In various embodiments, the computer-readable program code portions including one or more executable portions are also configured to determine a third verification node with the third verification node being used to generate a third representation of a third segment of the passcode; receive the third representation of the third segment from the third verification node with the third representation corresponding to each of the one or more characters in the third segment of the passcode; and verify the third representation of the passcode based on the at least one verification key.

In various embodiments, the computer-readable program code portions including one or more executable portions are also configured to cause a transmission to the first verification node for the first segment of the passcode and cause a transmission to the second verification node for the second segment of the passcode.

In still another example embodiment, a method for auto-generated authentication of network communications is provided. The method includes determining a first verification node and a second verification node. The first verification node is used to generate a first representation of a first segment of a passcode and the second verification node is used to generate a second representation of a second segment of the passcode. The method also includes receiving the first representation of the first segment from the first verification node. The first representation corresponds to each of the one or more characters in the first segment of the passcode. The method further includes receiving the second representation of the second segment from the second verification node. The second representation corresponds to each of the one or more characters in the second segment of the passcode. The method still further includes verifying the first segment and the second segment of the passcode based on at least one verification key. The method also includes providing approval to an access request associated with a user. The user is provided access to a network based on the approval to the access request.

In various embodiments, the method also includes receiving the access request associated with the user with the access request including a request for the passcode to be provided and the passcode being used to provide access to the user.

In various embodiments, the method also includes determining the passcode based on the first representation of the first segment and the second representation of the second segment.

In various embodiments, the approval to the access request is providing the passcode to an entity associated with the access request. In various embodiments, the access request comprises a request for a one-time password to be used to receive access to the network.

In various embodiments, the method also includes determining a third verification node with the third verification node being used to generate a third representation of a third segment of the passcode; receiving the third representation of the third segment from the third verification node with the third representation corresponding to each of the one or more characters in the third segment of the passcode; and verifying the third representation of the passcode based on the at least one verification key.

In various embodiments, the method also includes causing a transmission to the first verification node for the first segment of the passcode and causing a transmission to the second verification node for the second segment of the passcode.

The features, functions, and advantages that have been discussed may be achieved independently in various embodiments of the present disclosure or may be combined with yet other embodiments, further details of which can be seen with reference to the following description and drawings.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1A:
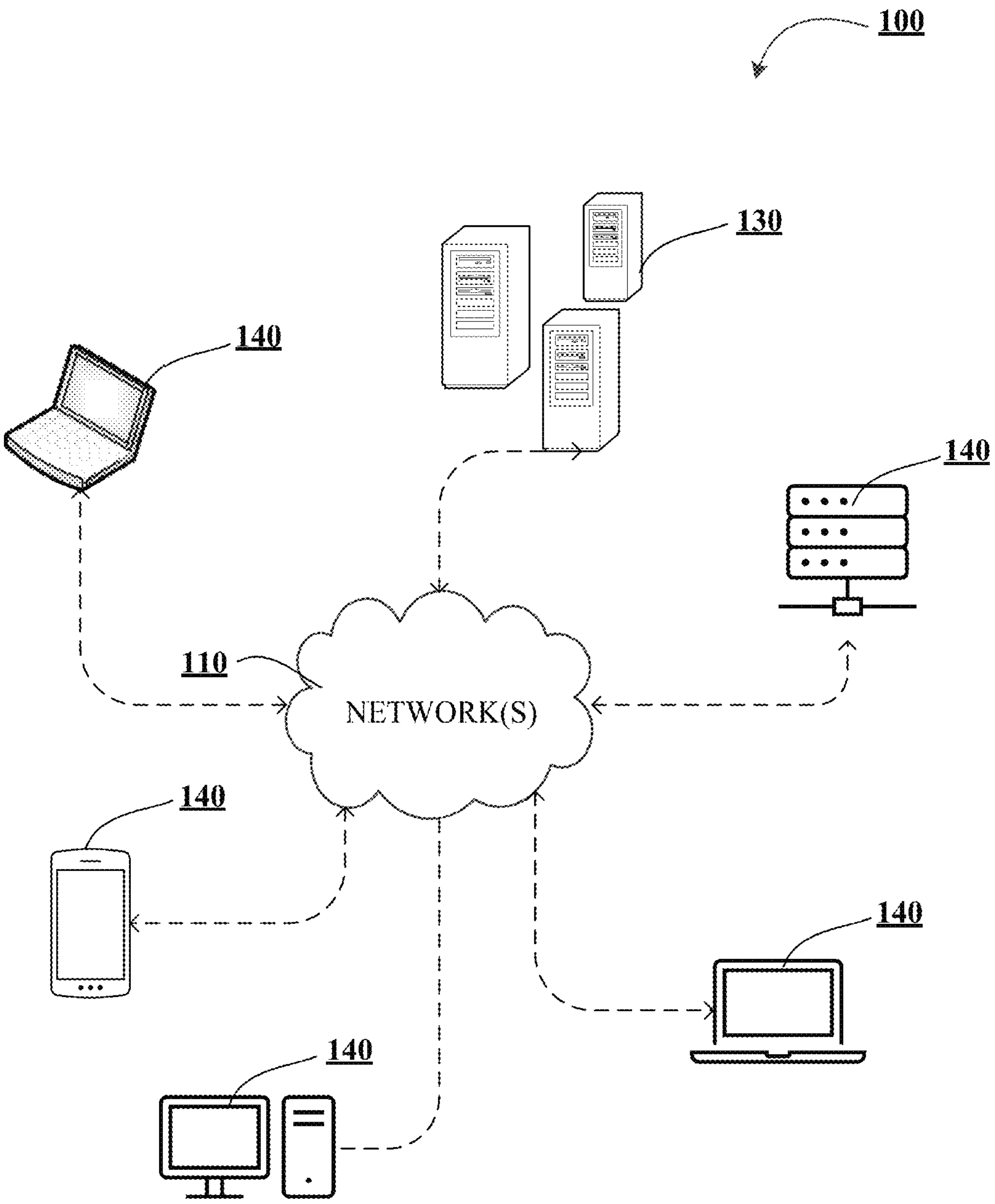
FIGS. 1A-1C illustrate technical components of an example distributed computing environment for autogenerated authentication of network communications, in accordance with various embodiments of the present disclosure.

Embodiments of the present disclosure will now be described more fully hereinafter with reference to the accompanying drawings, in which some, but not all, embodiments of the disclosure are shown. Indeed, the various inventions may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term “a” and/or “an” shall mean “one or more,” even though the phrase “one or more” is also used herein. Furthermore, when it is said herein that something is “based on” something else, it may be based on one or more other things as well. In other words, unless expressly indicated otherwise, as used herein “based on” means “based at least in part on” or “based at least partially on.” Like numbers refer to like elements throughout.

As used herein, an “entity” may be any institution employing information technology resources and particularly technology infrastructure configured for processing large amounts of data. Typically, these data can be related to the people who work for the organization, its products or services, the customers, or any other aspect of the operations of the organization. As such, the entity may be any institution, group, association, financial institution, establishment, company, union, authority or the like, employing information technology resources for processing large amounts of data.

As described herein, a “user” may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Person in the Middle Attacks, which involve malfeasant actors positioning between two nodes of a transmission. For example, a person in the middle attack may gain access to information being transmitted by a user and can then use said information, such as personal information, account information, etc., to launch attacks. Person in the middle attacks can also be used during the authentication process. Multi-factor authentication also includes requesting and transmitting passcodes that are used to verify the identity of a user. However, malfeasant actors may intercept the passcode (e.g., a one-time password) and use the passcode to impersonate the user. In such an instance, the improved authentication requirements no longer improve security. As such, protecting against such attacks specifically improves authentication by providing additional security to authentication processes.

Various embodiments of the present disclosure allow for autogenerated authentication of network communications. To do this, the system uses individual verification nodes to create representations that correspond to individual segments of the passcode. The system selects a plurality of verification nodes to be used to create representations associated with individual segments of the passcode. The system receives the individual representations along with the verification key(s) used to create each representation. Each individual verification node may use a different verification key and the verification key for the given verification node may be changed across multiple operations. The system may receive each of the representations and use the verification key(s) to determine the passcode and provide an approval to an access request for a user to access a portion of a network (e.g., a webpage). The approval may be sent to the entity network associated with the portion of the network, such that the end-point device receives access to the portion of the network without having to receive the passcode.

Various embodiments specifically improve authentication and network security. As a result of using multiple verification nodes, the individual transmission packets from one verification node does not provide enough information for a malfeasant actor to launch a successful attack. For example, to determine the passcode, a malfeasant actor would have to obtain at least each individual representation for each segment of the passcode, each verification key along with information on which verification key was used for each representation, and the order of the segments in the passcode. As such, various embodiments of the present disclosure improve authentication and network security, while maintaining and/or improving user experience. For example, since all of the operations are completed in the background, the user does not even have to know the passcode, but instead may merely receive access to the portion of the network requested.

Figure 1B:
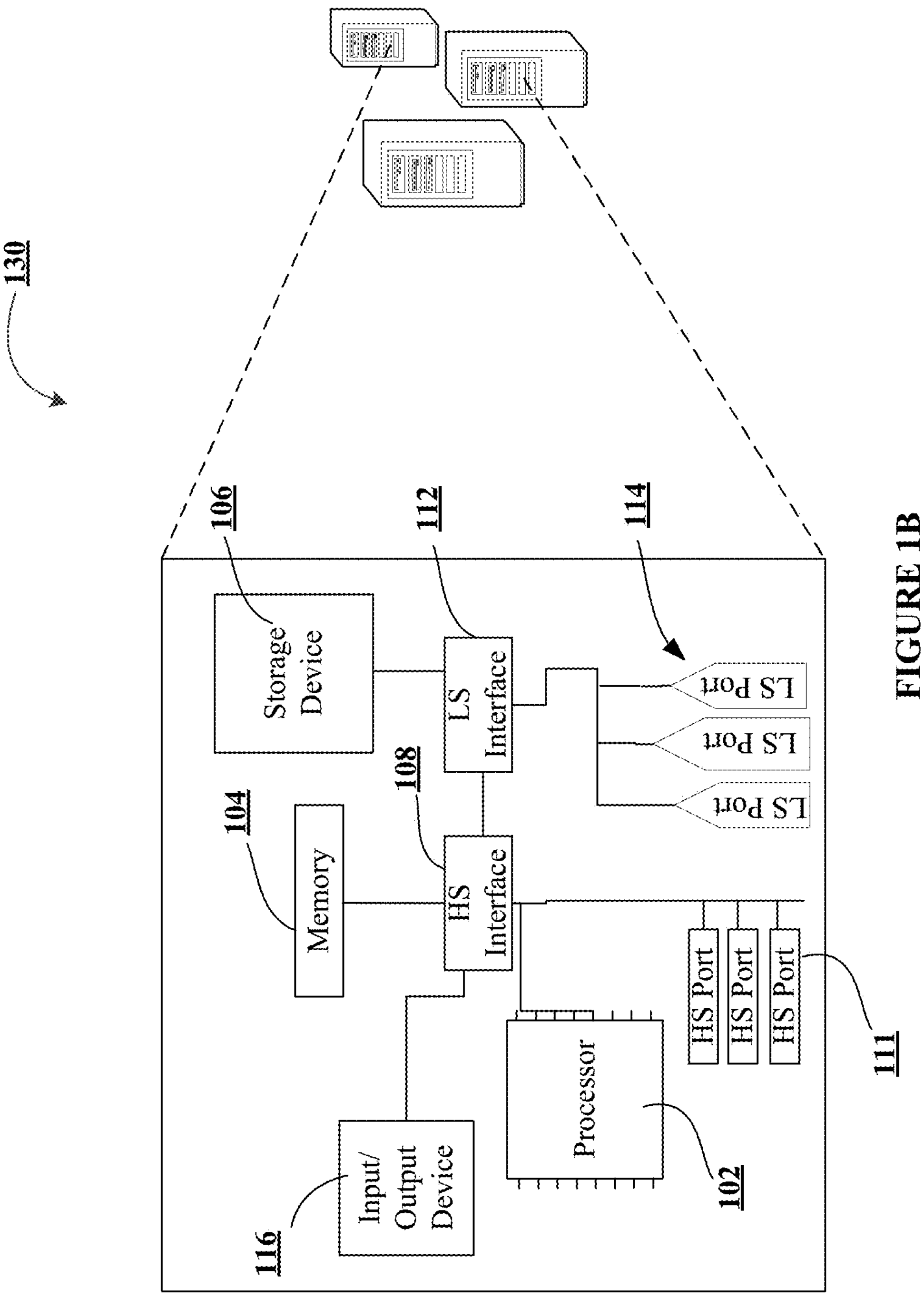
Figure 1C:
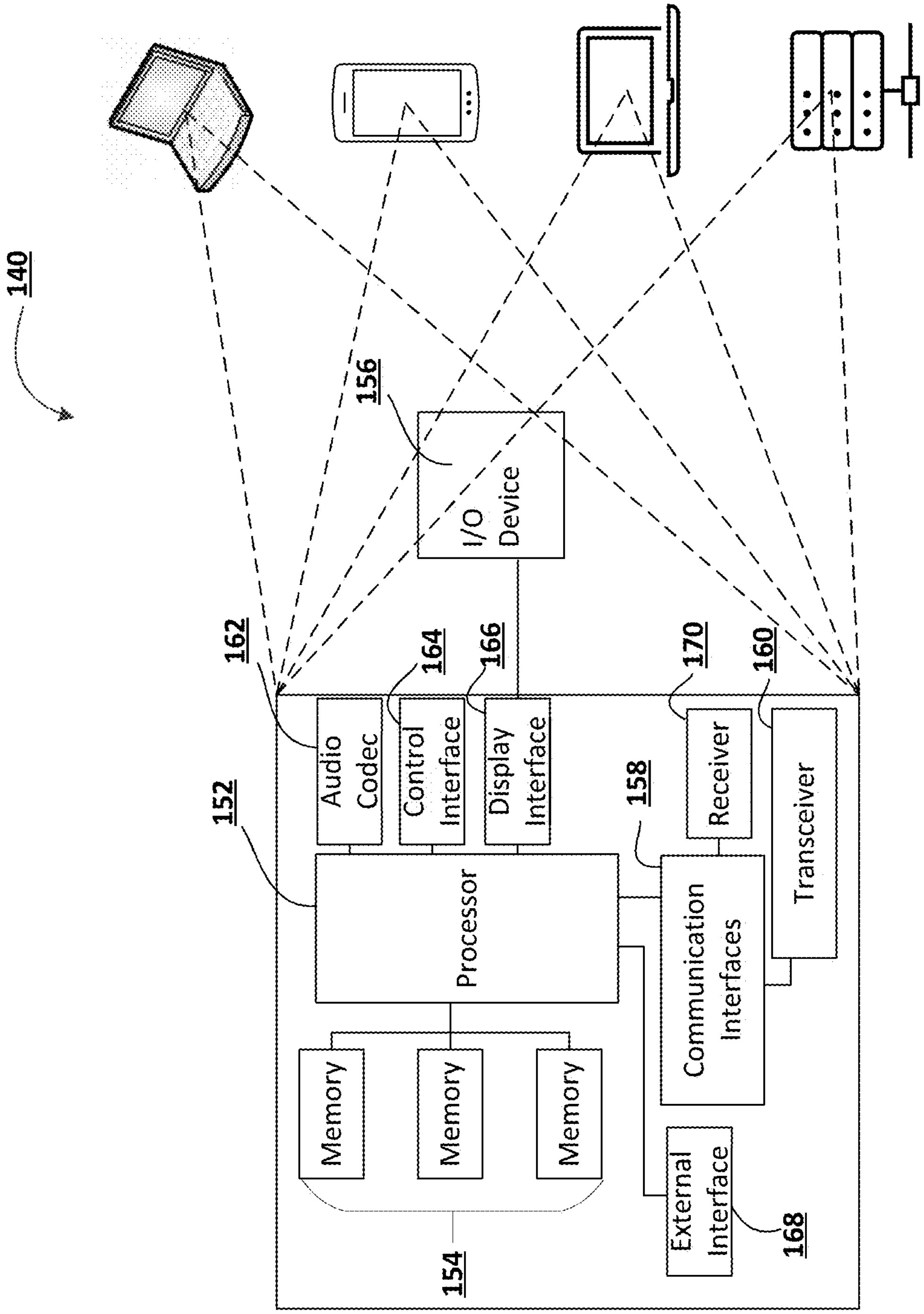

FIGS. 1A-1C illustrate technical components of an exemplary distributed computing environment for autogenerated authentication of network communications, in accordance with various embodiments of the disclosure. As shown in FIG. 1A, the distributed computing environment 100 contemplated herein may include a system 130 (e.g., an authentication device), an end-point device(s) 140, and one or more networks 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system). In various embodiments, the plurality of verification nodes may be part of the system 130, one or more end-point devices, and/or other devices connected to the network 110.

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network(s) 110. Instead of having a central server (e.g., system 130) which would act as the shared drive, each device that is connect to the network(s) 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network(s) 110 may be a distributed network that is spread over different networks. This provides a single data communication network, which can be managed jointly or separately by each network. Besides shared communication within the network, the distributed network often also supports distributed processing. The network(s) 110 may be a form of digital communication network such as a telecommunication network, a local area network ("LAN"), a wide area network ("WAN"), a global area network ("GAN"), the Internet, satellite network, cellular network, and/or any combination of the foregoing. The network(s) 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosure described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low-speed expansion port 114 (shown as "LS Port") and storage device 106. Each of the components 102, 104, 106 108, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

The high-speed interface 108 manages bandwidth-intensive operations for the system 130, while the low-speed interface 112 manages lower bandwidth-intensive operations. Such allocation of functions is exemplary only. In some embodiments, the high-speed interface 108 (shown as “HS Interface”) is coupled to memory 104, input/output (I/O) device 116 (e.g., through a graphics processor or accelerator), and to high-speed expansion ports 111 (shown as “HS Port”), which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interfaces 158, and a transceiver 160, among other components. The end-point device(s) 140 may also be provided with a storage device, such as a micro-drive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single in Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network(s) 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through at least one of communication interfaces 158, which may include digital signal processing circuitry where necessary. Communication interfaces 158 may provide for communications under various modes or protocols, such as the Internet Protocol (IP) suite (commonly known as TCP/IP). Protocols in the IP suite define end-to-end data handling methods for everything from packetizing, addressing, and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interfaces 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130. The end-point device(s) 140 may include a communication interface that is configured to operate with a satellite network.

In various embodiments, the end-point device(s) 140 may have multiple communication interfaces that are configured to operate using the various communication methods discussed herein. For example, an end-point device 140 may have a cellular network communication interface (e.g., a communication interface that provides for communication under various telecommunications standards) and a satellite network communication interface (e.g., a communication interface that provides for communication via a satellite network). Various other communication interfaces may also be provided by the end-point device (e.g., an end-point device may be capable of communicating via a cellular network, a satellite network, and/or a wi-fi connection). Various communication interfaces may share components with other communication interfaces in the given end-point device.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

Figure 2A:
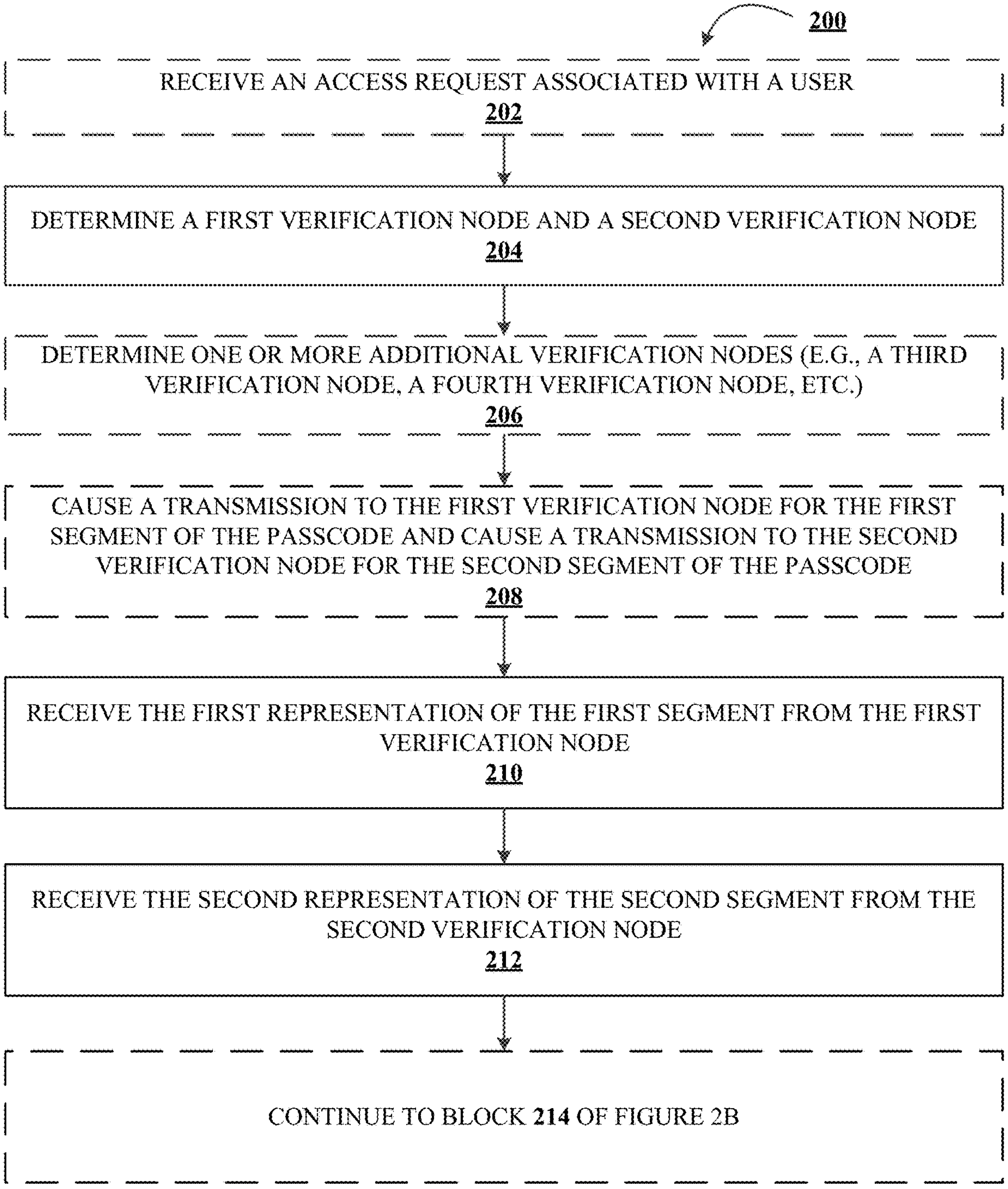
FIGS. 2A and 2B illustrate a process flow for autogenerated authentication of network communications, in accordance with various embodiments of the present disclosure.
Figure 2B:
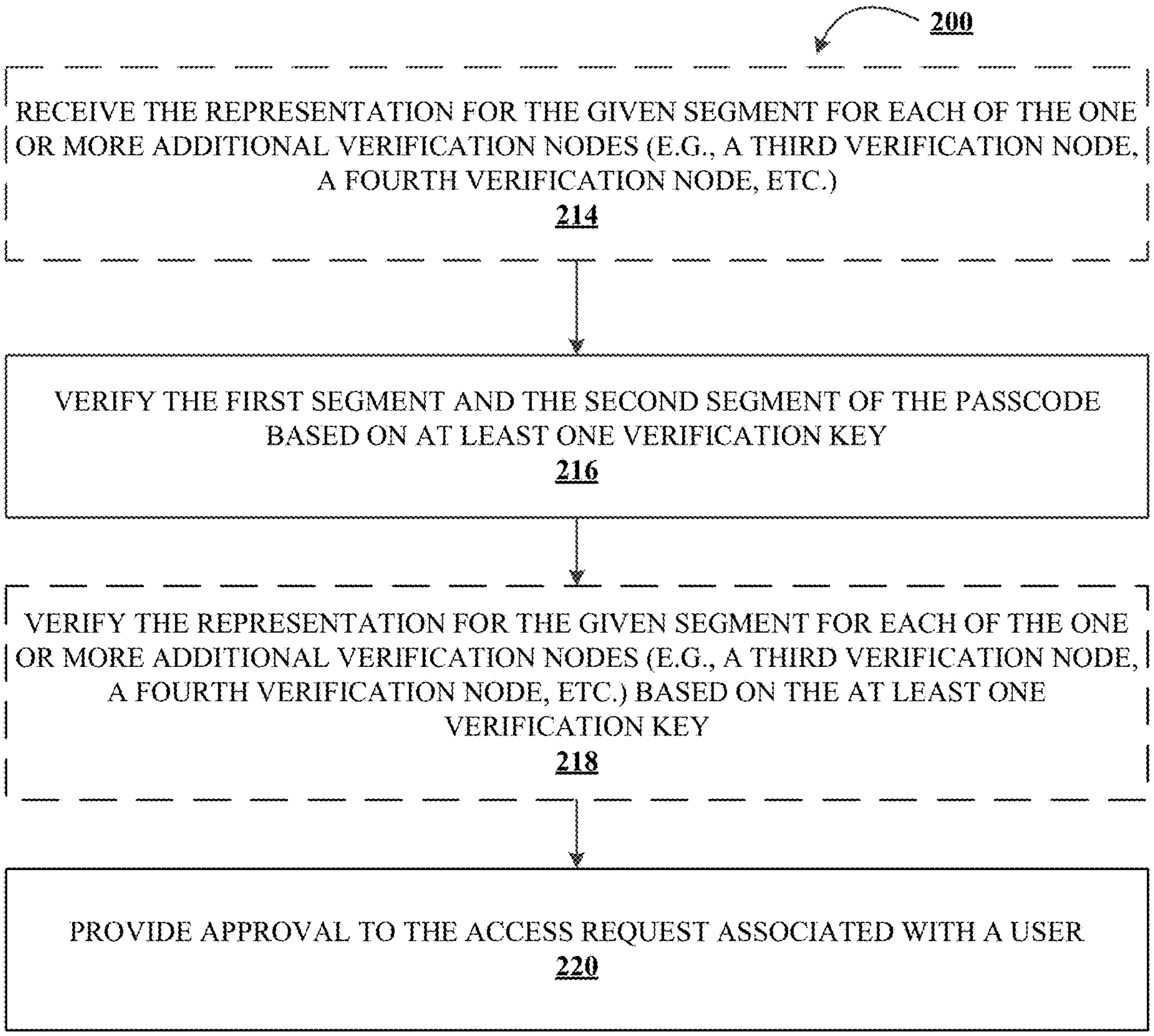

FIGS. 2A and 2B include a flow chart 200 that illustrates an example method for autogenerated authentication of network communications. The method may be carried out by various components of the distributed computing environment 100 discussed herein (e.g., the system 130, one or more end-point devices 140, etc.). An example system may include at least one non-transitory storage device and at least one processing device coupled to the at least one non-transitory storage device. In such an embodiment, the at least one processing device is configured to carry out the method discussed herein. A method of various embodiments may include any combination or subset of the features discussed herein.

Referring now to optional Block 202 of FIG. 2A, the method includes receiving an access request associated with a user. The access request includes a request for authentication. The request for authentication may be for access to a specific portion of a network, such as a webpage or application. For example, the request for authentication may be used in order to gain access to a user account on a webpage (e.g., along with the functionality associated with gaining access).

In various embodiments, the access request may include a request for a passcode to be provided. The passcode, for example, may be a one-time password used to access to the network. As such, in various embodiments, the passcode is used to provide access to the user. For example, in an instance in which a user is attempting to access a website, the user may provide account credentials and the access request may be generated as a part of the authentication process (e.g., a one-time password may be used to authenticate the user). While various embodiments include a passcode, the operations discussed herein may be used for various different types of authentication transmissions (e.g., any number of authentication messages may be broken into segments like the passcode discussed herein).

The access request may be received from an end-point device associated with the user (e.g., a mobile device of the user) and/or an end-point device associated with the network (e.g., an entity associated with a webpage in which the user is seeking access). For example, the end-point device may use the system of various embodiments to approve the access request and provide said approval to the network entity (e.g., entity associated with the portion of network in which access is being requested). The access request may include information relating to the request, such as the portion of the network attempting to be accessed, entities associated with the portion of the network attempting to be accessed, information relating to the user (e.g., access levels, previous usage patterns, etc.).

Referring now to Block 204 of FIG. 2A, the method includes determining a first verification node and a second verification node. A verification node may be an automated and/or manual node. A verification node is capable of generating a representation for a segment of the passcode. For example, the first verification node may be used to generate a first representation of a first segment of a passcode, the second verification node is used to generate a second representation of a second segment of a passcode, etc. The verification node may be an individual computing device (e.g., an end-point device), a partitioned portion of a computing device (e.g., multiple verification node may be included on a single end-point device or system), a user via an end-point device (e.g., a verification node may be a manual verification user that performs the operations discussed herein).

In various embodiments, the determined verification nodes (e.g., the first verification node and the second verification node) may determine the given segment of the passcode (e.g., the first verification node may create the first segment of the passcode, the second verification node may create the second segment of the passcode, etc.). Alternatively, the verifications nodes may be provided the given segment of the passcode (e.g., the first verification node may receive the first segment of the passcode, the second verification node may receive the second segment of the passcode, etc.).

In various embodiments, each verification node may only create and/or receive the given segment associated with the verification node, such that any verification node does not have all of the passcode. For example, the first verification node may create or receive the first segment of the passcode, but not know the second segment of the passcode and the second verification node may create or receive the second segment of the passcode, but not know the first segment of the passcode.

In various embodiments, the network may include a plurality of verification nodes. As such, any number of verification nodes may be selected to generate representations as discussed herein. In various embodiments, at least a first verification node and a second verification node are determined to be used for a given operation. In such an example, additional verification nodes may not be used for a given passcode, but instead be used in other instances. In various embodiments, the selection of the verification nodes may be randomized (e.g., the first verification node and the second verification node may not necessarily be sequentially related).

Referring now to optional Block 206 of FIG. 2A, the method includes determining one or more additional verification nodes (e.g., a third verification node, a fourth verification node, etc.). As discussed above, the operations may be completed using various numbers of verification nodes. The number of verification nodes used in an operation may be based on the number of desired segments in the passcode (e.g., each verification node used will generate a representation for a different segment of the passcode). As such, the more segments, the higher the level of security (e.g., more individual nodes would have to be compromised in order for an attack to be successful). The operations discussed herein discuss a first verification node and a second verification node as an example of the operations and may include any number of verification nodes.

Referring now to optional Block 208 of FIG. 2A, the method includes causing a transmission to the first verification node for the first segment of the passcode and causing a transmission to the second verification node for the second segment of the passcode. The transmission to the first verification node and the second verification node (and any additional verification nodes, such as the nodes determined in Block 206) may relate to a given segment of the passcode. For example, the transmission may be a request to generate a segment of the passcode and/or a representation of the segment of the passcode. The transmissions may include information relating to the given segment, such as length of desired segment. In an example embodiment, the system may cause a transmission to the first verification node and the second verification node upon selecting the given node, such that the verification node is instructed to generate a segment of the passcode and/or generate a representation of the segment of the passcode.

Referring now to Block 210 of FIG. 2A, the method includes receiving the first representation of the first segment from the first verification node. In various embodiments, the first verification node generates the first representation of the first segment of the passcode based on a verification key. The verification key includes one or more representations that correspond to a character of the segment of the passcode. For example, each alphanumerical character may have a different representation.

The representation may include one or more characters, one or more images, and/or the like. As such, the first representation may include one or more representations for all of the characters in the first segment of the passcode. For example, the first segment of the passcode may be 828, where the number 8 corresponds to the letter R and the number 2 corresponds to the letter P, such that the first representation of the first segment of the passcode is RPR. In various embodiments, multi-digit characters may have a single representation (e.g., a specific picture of a cup may correspond to the number 828). As such, the verification key corresponding to the first representation may be used to determine the first segment of the passcode based on the first representation.

In various embodiments, each of the verification nodes may use an individual verification key. For example, the first verification node may have a first verification key used to create the first representation and the second verification node may have a second verification key used to create the second representation. The verification key used by a given verification node may be changed between creation of different segments by the verification node. For example, the first verification key may use one verification key to generate a representation of a segment for a first passcode but use a different verification key to generate a representation of a segment for a second passcode.

In various embodiments, the system may receive the verification key used to generate the first representation of the first segment of the passcode. The verification key may be received from the first verification node along with the first representation (e.g., as an individual transmission receive at a similar time as the first representation). In various embodiments, the system may receive an indication on the verification key used for the first representation. For example, the first representation may indicate the verification key used to generate the first representation. In various embodiments, the system may have access to one or more verification keys (e.g., stored on the system 130), such that the given verification key may be referenced in order to determine the first segment of the passcode based on the first representation.

Referring now to Block 212 of FIG. 2A, the method includes receiving the second representation of the second segment from the second verification node. The second representation corresponds to each of the one or more characters in the second segment of the passcode.

In various embodiments, the second verification node generates the second representation of the second segment of the passcode based on a verification key. The verification key may be the same or different than the verification key used by the first verification node. The verification key includes one or more representations that correspond to a character of the segment of the passcode. For example, each alphanumerical character may have a different representation.

The representation may include one or more characters, one or more images, and/or the like. As such, the second representation may include one or more representations for all of the characters in the second segment of the passcode. For example, the second segment of the passcode may be 919, where the number 9 corresponds to the letter C and the number 1 corresponds to the letter L, such that the second representation of the second segment of the passcode is CLC. In various embodiments, multi-digit characters may have a single representation (e.g., a specific picture of a cup may correspond to the number 919). As such, the verification key corresponding to the second representation may be used to determine the second segment of the passcode based on the second representation.

In various embodiments, each of the verification nodes may use an individual verification key. For example, the first verification node may have a first verification key used to create the first representation and the second verification node may have a second verification key used to create the second representation. The verification key used by a given verification node may be changed between creation of different segments by the verification node. For example, the second verification key may use one verification key to generate a representation of a segment for a first passcode but use a different verification key to generate a representation of a segment for a second passcode.

In various embodiments, the system may receive the verification key used to generate the second representation of the second segment of the passcode. The verification key may be received from the second verification node along with the second representation (e.g., as an individual transmission receive at a similar time as the second representation). In various embodiments, the system may receive a transmission with the verification key(s) used for various representations (e.g., the verification key used for the first representation, the verification key used for the second representation, etc.). In various embodiments, the system may receive an indication on the verification key used for the second representation. For example, the second representation may indicate the verification key used to generate the second representation. In various embodiments, the system may have access to one or more verification keys (e.g., stored on the system 130), such that the given verification key may be referenced in order to determine the second segment of the passcode based on the second representation.

Referring now to optional Block 214 of FIG. 2B, the method includes receiving the representation for the given segment for each of the one or more additional verification nodes (e.g., a third verification node, a fourth verification node, etc.). The additional representations may be received in the same way that the first representation and/or the second representation are received. As such, the additional representation (e.g., the third representation, the fourth representation, etc.) corresponds to each of the one or more characters in the given segment of the passcode. In various embodiments, the additional verification node generates the additional representations based on one or more verification keys. For example, each verification node may have a verification key. Information relating to the verification key used for each representation may be received by the system in the same or similar fashion as the verification key(s) used for the first representation and the second representation.

Referring now to Block 216 of FIG. 2B, the method includes verifying the first segment and the second segment of the passcode based on at least one verification key. The verification of the first segment and the second segment may be completed by determining the given segment of the passcode using the given verification key corresponding to the given representation. For example, the first verification key may be used to determine the first segment of the passcode using the first representation and the second verification key may be used to determine the second segment In various embodiments, the method includes determining the passcode based on the first representation of the first segment and the second representation of the second segment. To do this, the individual segments are determined and then put together to create the passcode. As such, each representation (e.g., first representation, second representation, any additional representations, and/or the like) may be decoded to indicate the given segment of the passcode and then put together to form the passcode. The order of the segments may be determined by the system, such that the individual verification nodes do not necessarily know the order of the segments and the individual representations (e.g., first representation, second representation, etc.) do not indicate the order of the segment. For example, if a first representation is intercepted by a malfeasant actor, the first representation does not provide an indication on what portion of the passcode the representation is corresponding. As such, a malfeasant actor does not only need the representation for each segment of the passcode, but also the verification key(s) used for each representation, and the order of the segments.

While the operations herein discuss a first segment and a second segment, the passcode may be divided into any number of segments, such that each segment must be decoded by the system and ordered to determine the passcode.

Referring now to optional Block 218 of FIG. 2B, the method includes verifying the representation for the given segment for each of the one or more additional verification nodes (e.g., a third verification node, a fourth verification node, etc.) based on the at least one verification key. The verification of the additional segments may be completed in the same way the first segment and the second segment are verified. The additional segments may be used to create the passcode (e.g., along with the first segment and the second segment).

Referring now to Block 220 of FIG. 2B, the method includes providing approval to the access request associated with a user. In various embodiments, the user is provided access to a network based on the approval to the access request. In various embodiments, the approval to the access request may include providing the passcode to an entity associated with the access request. For example, the entity associated with a webpage may receive the approval to the access request. The approval to the access request may be the passcode or a confirmation of a valid passcode from the system.

In various embodiments, the passcode may be provided to the network entity, such that the user receives the request access without having to receive the passcode. For example, the end-point device associated with the user may receive the requested network access without ever receiving the passcode or any representations associated with the passcode. As such, the end-point device associated with the user may not be required to input any passcode(s), but instead merely waits for the operations herein to be completed and access to be approved. In an example in which the passcode is provided to the user, the user may then provide the passcode to the network entity to receive access.

In various embodiments, the approval to the access request associated with a user may be an indication that the passcode has been verified. For example, the system may determine the passcode and compare the passcode to an expected passcode characteristic (e.g., the passcode may match the passcode guidelines, such as character length, character values, etc.). In various embodiments, the entity network may allow the user to access the portion of the network via the indication from the system (e.g., the system verifies the passcode, but does not necessarily have to transmit the passcode).

As will be appreciated by one of ordinary skill in the art, various embodiments of the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, micro-code, and the like), an entirely hardware embodiment, or an embodiment combining software and hardware aspects that may generally be referred to herein as a "system." Furthermore, embodiments of the present disclosure may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present disclosure, however, the computer-readable medium may be transitory, such as a propagation signal including computer-executable program code portions embodied therein.

It will also be understood that one or more computer-executable program code portions for carrying out the specialized operations of the present disclosure may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present disclosure are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present disclosure are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present disclosure.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications, and substitutions, in addition to those set forth in the above paragraphs, are possible. Those skilled in the art will appreciate that various adaptations and modifications of the just described embodiments can be configured without departing from the scope and spirit of the disclosure. Therefore, it is to be understood that, within the scope of the appended claims, the disclosure may be practiced other than as specifically described herein.

What is claimed is:

1. A system for autogenerated authentication of network communications, the system comprising:

at least one non-transitory storage device containing instructions; and at least one processing device coupled to the at least one non-transitory storage device wherein the at least one processing device, upon execution of the instructions, is configured to:

receive an access request associated with a user comprising a request for authentication of a one-time passcode (OTP) for access to a portion of a network;

determine, randomly from a plurality of available nodes based on at least a quantity of segments of the OTP, a first verification node and a second verification node for generating disparate segments of the OTP based on a first verification key such that the second verification node cannot access a first segment of the OTP generated by the first verification node and the second verification node cannot access a second segment of the OTP generated by the second verification node;

generate, at the first verification node, a first representation of the first segment of the OTP, wherein the first segment of the OTP comprises a first plurality of numeric characters and the first representation comprises one or more non-numeric characters associated with the first plurality of numeric characters;

generate, at the second verification node, a second representation of the second segment of the OTP, wherein the second segment of the OTP comprises a second plurality of numeric characters and the second representation comprises an image associated with the second plurality of numeric characters;

receive the first representation associated with the OTP transmitted from the first verification node;

receive the second representation associated with the OTP transmitted from the second verification node;

determine, randomly from the plurality of available nodes, a third verification node, wherein the third verification node is used to generate a third representation of a third segment of the OTP;

receive the third representation of the third segment from the third verification node, wherein the third representation corresponds to each of one or more characters in the third segment of the OTP;

authenticate the access request based on a plurality of representations associated with of the OTP based on at least one verification key, wherein the plurality of representations comprise the first representation, the second representation and the third representation associated with the OTP, wherein authenticating the access request further comprises:

decoding each of the plurality of representations to determine an associated segment of the OTP;

determining an order for a plurality of segments of the OTP comprising the first segment, the second segment, and the third segment; and combining the plurality of segments of the OTP based on the determined order; and wherein the at least one verification key comprises comprising a first verification key corresponding to the first verification node, a second verification key corresponding to the second verification node, and a third verification key corresponding to the third verification node; and provide approval to an access request associated with a user, wherein the user is provided access to a network based on the approval to the access request.

2. The system of claim 1, wherein the at least one processing device, upon execution of the instructions, is configured to receive the access request associated with the user, wherein the access request comprises a request for the OTP to be provided, wherein the OTP is used to provide access to the user.

3. The system of claim 1, wherein the at least one processing device, upon execution of the instructions, is configured to determine the OTP based on the first representation of the first segment and the second representation of the second segment.

4. The system of claim 1, wherein the approval to the access request is providing the OTP to an entity associated with the access request.

5. The system of claim 1, wherein the access request comprises a request for a one-time password to be used to receive access to the network.

6. The system of claim 1, wherein the at least one processing device, upon execution of the instructions, is configured to cause a transmission of the first segment of the OTP to the first verification node and cause a transmission of the second segment of the OTP to the second verification node.

7. A computer program product for autogenerated authentication of network communications, the computer program product comprising at least one non-transitory computer-readable medium having computer-readable program code portions embodied therein, the computer-readable program code portions comprising one or more executable portions configured to:

receive an access request associated with a user comprising a request for authentication of a one-time passcode (OTP) for access to a portion of a network;

determine, randomly from a plurality of available nodes based on at least a quantity of segments of the OTP, a first verification node and a second verification node for generating disparate segments of the OTP based on a first verification key such that the second verification node cannot access a first segment of the OTP generated by the first verification node and the second verification node cannot access a second segment of the OTP generated by the second verification node;

generate, at the first verification node, a first representation of the first segment of the OTP, wherein the first segment of the OTP comprises a first plurality of numeric characters and the first representation comprises one or more non-numeric characters associated with the first plurality of numeric characters;

generate, at the second verification node, a second representation of the second segment of the OTP, wherein the second segment of the OTP comprises a second plurality of numeric characters and the second representation comprises an image associated with the second plurality of numeric characters;

receive the first representation associated with the OTP transmitted from the first verification node;

receive the second representation associated with the OTP transmitted from the second verification node;

determine, randomly from the plurality of available nodes, a third verification node, wherein the third verification node is used to generate a third representation of a third segment of the OTP;

receive the third representation of the third segment from the third verification node, wherein the third representation corresponds to each of one or more characters in the third segment of the OTP;

authenticate the access request based on a plurality of representations associated with the OTP based on at least one verification key, wherein the plurality of representations comprise the first representation, the second representation and the third representation associated with the OTP, wherein authenticating the access request further comprises:

decoding each of the plurality of representations to determine an associated segment of the OTP;

determining an order for a plurality of segments of the OTP comprising the first segment, the second segment, and the third segment; and combining the plurality of segments of the OTP based on the determined order; and wherein the at least one verification key comprises a first verification key corresponding to the first verification node, a second verification key corresponding to the second verification node, and a third verification key corresponding to the third verification node; and provide approval to an access request associated with a user, wherein the user is provided access to a network based on the approval to the access request.

8. The computer program product of claim 7, wherein the computer-readable program code portions comprising one or more executable portions are also configured to receive the access request associated with the user, wherein the access request comprises a request for the OTP to be provided, wherein the OTP is used to provide access to the user.

9. The computer program product of claim 7, wherein the computer-readable program code portions comprising one or more executable portions are also configured to determine the OTP based on the first representation of the first segment and the second representation of the second segment.

10. The computer program product of claim 7, wherein the approval to the access request is providing the OTP to an entity associated with the access request.

11. The computer program product of claim 7, wherein the access request comprises a request for a one-time password to be used to receive access to the network.

12. The computer program product of claim 7, wherein the computer-readable program code portions comprising one or more executable portions are also configured to cause a transmission to the first verification node for the first segment of the OTP and cause a transmission to the second verification node for the second segment of the OTP.

13. A method for autogenerated authentication of network communications, the method comprising:

receive an access request associated with a user comprising a request for authentication of a one-time passcode (OTP) for access to a portion of a network;

determine, randomly from a plurality of available nodes based on at least a quantity of segments of the OTP, a first verification node and a second verification node for generating disparate segments of the OTP based on a first verification key such that the second verification node cannot access a first segment of the OTP generated by the first verification node and the second verification node cannot access a second segment of the OTP generated by the second verification node;

generate, at the first verification node, a first representation of the first segment of the OTP, wherein the first segment of the OTP comprises a first plurality of numeric characters and the first representation comprises one or more non-numeric characters associated with the first plurality of numeric characters;

generate, at the second verification node, a second representation of the second segment of the OTP, wherein the second segment of the OTP comprises a second plurality of numeric characters and the second representation comprises an image associated with the second plurality of numeric characters;

receive the first representation associated with the OTP transmitted from the first verification node;

receive the second representation associated with the OTP transmitted from the second verification node;

determine, randomly from the plurality of available nodes, a third verification node, wherein the third verification node is used to generate a third representation of a third segment of the OTP;

receive the third representation of the third segment from the third verification node, wherein the third representation corresponds to each of one or more characters in the third segment of the OTP;

authenticate the access request based on a plurality of representations associated with the OTP based on at least one verification key, wherein the plurality of representations comprise the first representation, the second representation and the third representation associated with the OTP, wherein authenticating the access request further comprises:

decoding each of the plurality of representations to determine an associated segment of the OTP;

determining an order for a plurality of segments of the OTP comprising the first segment, the second segment, and the third segment; and combining the plurality of segments of the OTP based on the determined order; and wherein the at least one verification key comprises a first verification key corresponding to the first verification node, a second verification key corresponding to the second verification node, and a third verification key corresponding to the third verification node; and provide approval to an access request associated with a user, wherein the user is provided access to a network based on the approval to the access request.

14. The method of claim 13, further comprising receiving the access request associated with the user, wherein the access request comprises a request for the OTP to be provided, wherein the OTP is used to provide access to the user.

15. The method of claim 13, further comprising determining the OTP based on the first representation of the first segment and the second representation of the second segment.

16. The method of claim 13, wherein the approval to the access request is providing the OTP to an entity associated with the access request.

17. The method of claim 13, further comprising causing a transmission to the first verification node for the first segment of the OTP and causing a transmission to the second verification node for the second segment of the OTP.

* * * * *